United States Patent
Mastinu et al.

(10) Patent No.: US 7,665,371 B2
(45) Date of Patent: Feb. 23, 2010

(54) DEVICE AND METHOD FOR MEASURING FORCES AND MOMENTS

(75) Inventors: Gianpiero Mastinu, Cernobbio-Como (IT); Massimiliano Gobbi, Stradella-Pavia (IT)

(73) Assignee: Politecnico di Milano, Milan (IT)

( * ) Notice: Subject to any disclaimer, the term of this patent is extended or adjusted under 35 U.S.C. 154(b) by 0 days.

(21) Appl. No.: 10/565,338

(22) PCT Filed: Jul. 20, 2004

(86) PCT No.: PCT/EP2004/008247
§ 371 (c)(1), (2), (4) Date: May 22, 2006

(87) PCT Pub. No.: WO2005/015146
PCT Pub. Date: Feb. 17, 2005

(65) Prior Publication Data
US 2007/0107536 A1  May 17, 2007

(30) Foreign Application Priority Data
Jul. 22, 2003 (IT) ................ MI2003 A 001500

(51) Int. Cl.
*G01D 7/00* (2006.01)
(52) U.S. Cl. .................... 73/862.041; 73/760
(58) Field of Classification Search .................
  73/862.041–862.046, 760
See application file for complete search history.

(56) References Cited

U.S. PATENT DOCUMENTS

| | | | | |
|---|---|---|---|---|
| 3,780,573 A | * | 12/1973 | Reus ..................... | 73/146 |
| 4,216,467 A | | 8/1980 | Colston | |
| 4,635,479 A | * | 1/1987 | Salisbury et al. ....... | 73/862.045 |
| 4,905,523 A | * | 3/1990 | Okada ................... | 73/862.044 |
| 5,029,483 A | | 7/1991 | Gautschi et al. | |
| 5,063,788 A | * | 11/1991 | Ch'Hayder et al. .... | 73/862.043 |
| 5,222,400 A | * | 6/1993 | Hilton ................... | 73/862.043 |
| 5,295,399 A | * | 3/1994 | Grant et al. ............ | 73/862.043 |
| 6,105,438 A | * | 8/2000 | Gieseke ................ | 73/862.042 |
| 6,349,604 B1 | * | 2/2002 | Byun et al. ............ | 73/862.043 |
| 6,354,155 B1 | * | 3/2002 | Berme .................. | 73/862.043 |

(Continued)

FOREIGN PATENT DOCUMENTS

DE    40 18 558 A    12/1991

(Continued)

OTHER PUBLICATIONS

PCT Search Report, Dec. 23, 2004 (Seven Pages).

(Continued)

*Primary Examiner*—Max Noori
(74) *Attorney, Agent, or Firm*—James V. Costigan; Hedman & Costigan, P.C.

(57) ABSTRACT

A device for measuring forces and moments acting on a body comprises a measuring structure (12) made up of one or more elements and provided with a plurality of connection elements or bindings (17, 18, 37) for connecting the elements of the structure (12) and/or a body (11) the stress of which one wishes to measure, such a structure (12) being statically determined or else statically non determined, such a structure (12) also being equipped with means for measuring (14), in one or more locations, the six stress magnitudes from which the force vector and moment vector acting on the body (11) can be worked out mathematically.

9 Claims, 7 Drawing Sheets

U.S. PATENT DOCUMENTS

| | | | |
|---|---|---|---|
| 6,823,744 B2 * | 11/2004 | Ohsato et al. | 73/862.041 |
| 6,871,552 B2 * | 3/2005 | Liu et al. | 73/862.041 |
| 7,437,954 B2 * | 10/2008 | Sakano | 73/862.044 |
| 7,441,470 B2 * | 10/2008 | Morimoto | 73/862.045 |
| 2009/0173170 A1 * | 7/2009 | Mastinu et al. | 73/862.381 |

FOREIGN PATENT DOCUMENTS

| | | |
|---|---|---|
| DE | 41 01 732 A | 7/1992 |
| FR | 2 545 606 A | 11/1984 |
| FR | 2 696 002 A | 3/1994 |
| FR | 2 708 101 A | 1/1995 |
| SU | 1 747 961 A | 7/1992 |

OTHER PUBLICATIONS

Preusser et al. International Congress of Instrumentation in Aerospace Simulation, IEEE, U.S., Sep. 18, 1989, pp. 488-490.
Database WPI Derwent, Week 9328 (1993)XP002301037.

* cited by examiner

DEVICE AND METHOD FOR MEASURING FORCES AND MOMENTS

The present invention refers to a device and to a method for measuring forces and moments.

In many applications (mechanical and other) it is useful to measure a force vector and a moment vector applied to a structure or a body. As an example, it could be necessary to measure the forces and moments acting between a pneumatic tire and the road surface.

In general, rigid objects or sensors, arranged between structures or elements that exchange forces, are used for measuring the generalised forces acting between two structures or two elements.

A drawback of such systems is the design complexity, with consequent unacceptable large mass and dimensions for some applications.

The purpose of the present invention is that of realising a device and defining a method for measuring forces and moments also suitable for measuring dynamic stresses.

Another purpose of the present invention is that of realising a device for measuring forces and moments that is precise and sensitive.

Another purpose of the present invention is that of realising a device and defining a method for measuring forces and moments that is particularly simple and functional, with low costs.

These purposes according to the present invention are accomplished by realising a device and defining a method for measuring forces and moments as outlined in the independent claims.

Further characteristics are foresees in the dependent claims.

The characteristics and advantages of a device and method for measuring forces and moments according to the present invention shall become clearer from the following description, given as an example and not limiting purposes, referring to the attached schematic drawings, in which.

With reference to the figures, a device for measuring forces and moments is shown, wholly indicated with 10, shown in three different embodiments according to the invention.

The device for measuring forces and moments comprises a measuring structure 12, made up of one or more elements and provided with a plurality of bindings, or connection elements, for the connection between the elements of the structure itself and/or a body of which one wishes to find out the forces acting on, such that the structure 12 is statically determined or else statically non-determined.

The measuring structure 12 is subject to two generalised external forces, a moment vector T and a force vector F, oriented in any way, which are the generalised external forces that one wishes to measure acting upon the body.

For such measuring structures it is possible to establish a mathematical relationship between the vector $F_g = [F_x F_y F_z T_x T_y T_z]$ (defined by the components along three coordinated axes of the generalised external forces F and T) and the vector $S = [S_1 S_2 S_3 S_4 S_5 S_6]$ of measured magnitudes in one or more points of the structure.

The measured magnitudes can be local deformations, electrical charges generated by deformations, variations in electrical resistance due to variations in local deformations, or other, and can be detected through suitable measuring means 14 arranged on the structure 12.

In the static case such a relationship can be of the type $F_g = F_g(S)$.

Such a mathematical relationship can be linear, in which case the calculations to define $F_g$, by knowing the vector S, are relatively simple, indeed $$F_g = C \cdot S$$

where C is an invertible square matrix of order 6.

In the dynamic case the mathematical relationship can be of the type $$\dot{S} = \dot{S}(S, u)$$

$$F_g = F_g(S, u)$$

where u is a vector that represents a disturbance that is variable in time. In the case in which the system is linear the dynamic equations become $$\dot{S} = A \cdot S + B \cdot u$$

$$F_g = C' \cdot S + D \cdot u$$

where A, B, C' and D are matrices.

In the case of statically determined structures the matrices C, A, B, C', D mainly contain terms dependent upon the geometric dimensions of the measuring device; in the case of statically non determined structures the matrices C, A, B, C', D contain both the terms dependent upon the geometric dimensions of the measuring device and the terms related to the stiffness, in particular, of the connections (elastic joints).

Figure 1:
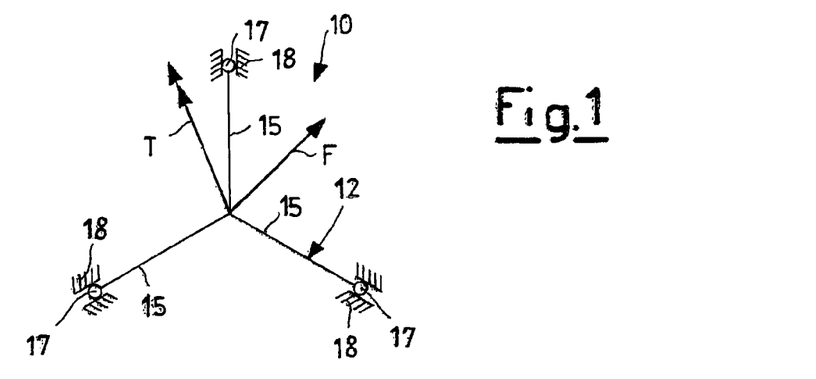
FIG. 1 schematically shows a first embodiment of a device for measuring forces and moments according to the present invention; the device is subject to generalised forces T and F.
Figure 2:
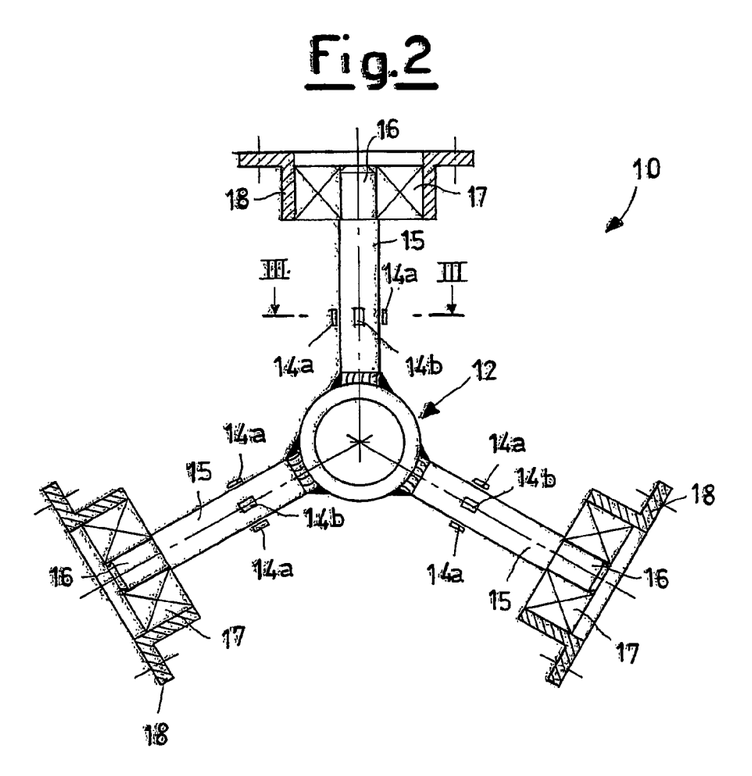
FIG. 2 is a top view of a possible embodiment of the device of FIG. 1.
Figure 3:
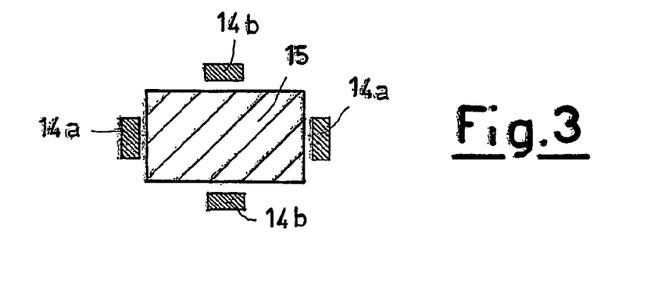
FIG. 3 is a section according to the line III-III of FIG. 2 shown enlarged.

FIGS. 1 to 3 show a first embodiment with three bindings of a device for measuring forces and moments 10 according to the present invention, in particularly suitable, amongst other things, for being mounted on the hub of a wheel, not shown, to measure the generalised forces acting on the wheel itself.

The device comprises the measuring structures 12 configured with three arms 15, for example arranged at 120°, carrying at the end 16 the connection elements or bindings consisting of three spherical joints 17, which are free to translate in the direction of the axis of the arms 15 thanks to the sliding type constraint 18 realised through a sleeve. In FIGS. 1 to 3, as an example, the straight arms 15 are shown, but of course the measuring structure 12 can consist of an element having three arms 15 with more complex shape.

With the constraints consisting of spherical joints 17 and sliding elements 18 each arm 15 of the structure 12 is subject to two bending moments acting orthogonally.

The two bending stresses, which are generated by the aforementioned two perpendicular bending moments, can be measured by two pairs of strain gauges 14$a$ and 14$b$ as shown in FIGS. 2 and 3, which constitute an example of possible measuring means.

In a first embodiment, shown schematically in FIG. 2 in a partial section view, the bindings arranged at the end of the arms 15, in other words the spherical joints 17 with sliders 18, can be realised through rigid elements. For example, the constraint 17 can be realised through spherical joints, self-aligning ball bearings or else radial ball bearings equipped with suitable axial clearance. The sleeve 18, acting at each spherical joint 17, can for example be realised through a plain bearing, a ball-circulation sleeve or else a sleeve with balls and/or rollers.

Figure 4:
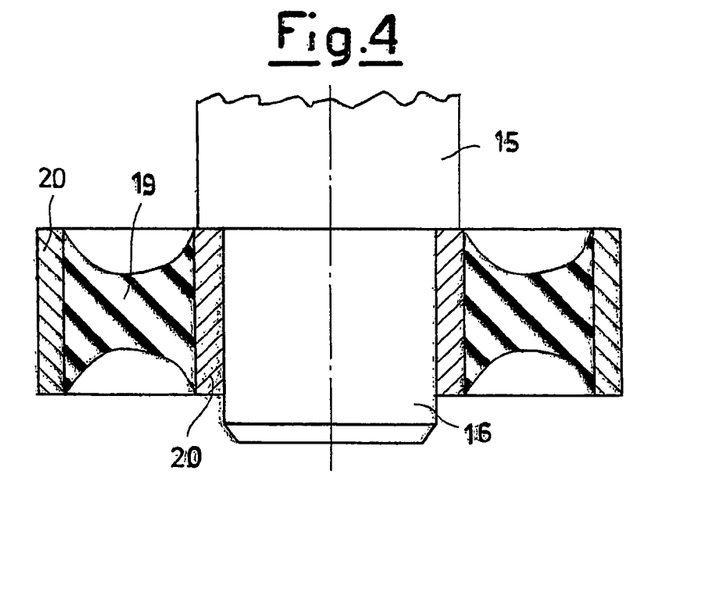
FIG. 4 shows a connection element of spherical and sliding joint type realised by means of an elastomer element.

Alternatively or in combination with the aforementioned rigid connection elements, elastic elements can be used with suitably defined characteristics to avoid the introduction of significant errors in the measurement of the generalised forces T and F. For example, the connection element according to one of the axes x and/or y and/or z can be an elastic support that is very rigid in the radial direction and very flexible in the other directions. For example, FIG. 4 shows, in a partial section view, an elastic spherical joint and elastic slider type constraint realised with an element made from elastomer 19, the shape of which can be different with respect to the one shown, inserted in two external cylinders 20, for example made from metal, inside which the end 16 of each arm 15 of the measuring structure 12, only partially shown, is inserted, which is thus subjected to an axially yielding and radially rigid constraint.

Figure 5:
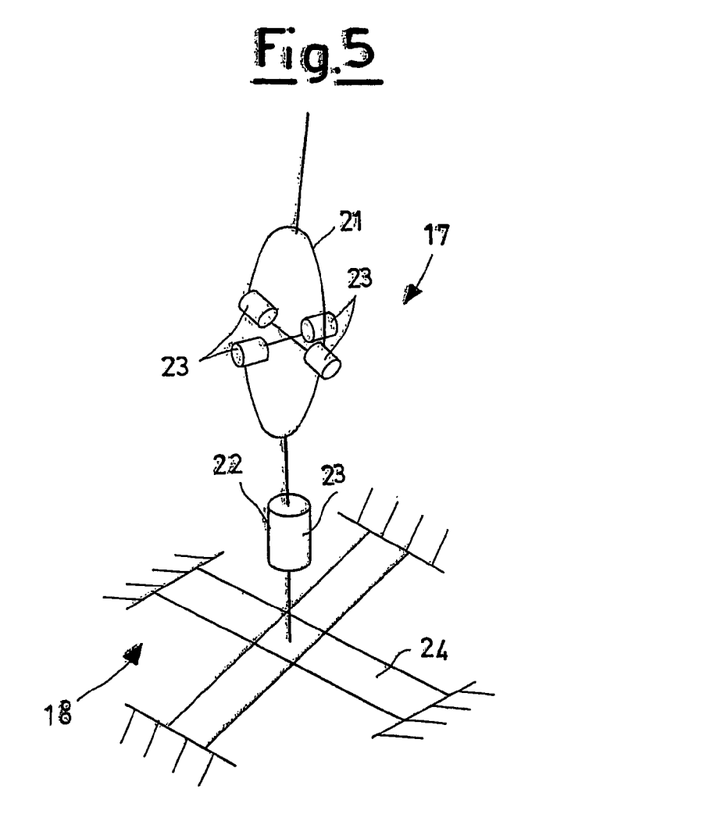
FIG. 5 schematically shows another spherical and sliding joint realised through elastic elements.

FIG. 5, on the other hand, schematically shows a further example of an elastic spherical joint 17 and elastic slider 18 type binding, comprising an elastic Hooke's joint 21 equipped with bushings with zero clearance and friction 23, arranged in series with an elastic cylindrical hinge 22 consisting of a further bushing with zero clearance and friction 23, so as to realise a spherical joint 17 with practically zero clearance and friction. A thin plate with four fixed ends 24 is placed in series with the spherical hinge 17 realising a slider 18 type constraint since it is axially yielding due to its elasticity.

The bushings 23 with practically zero clearance and friction can, for example, be realised with one or more thin plates subject to bending moment arranged inside the bushing themselves, not shown, purely as an example of the type of those produced by the company C-Flex Bearing Co., Inc., FRANKFORT, N.Y. 13340 USA.

Figure 5A:
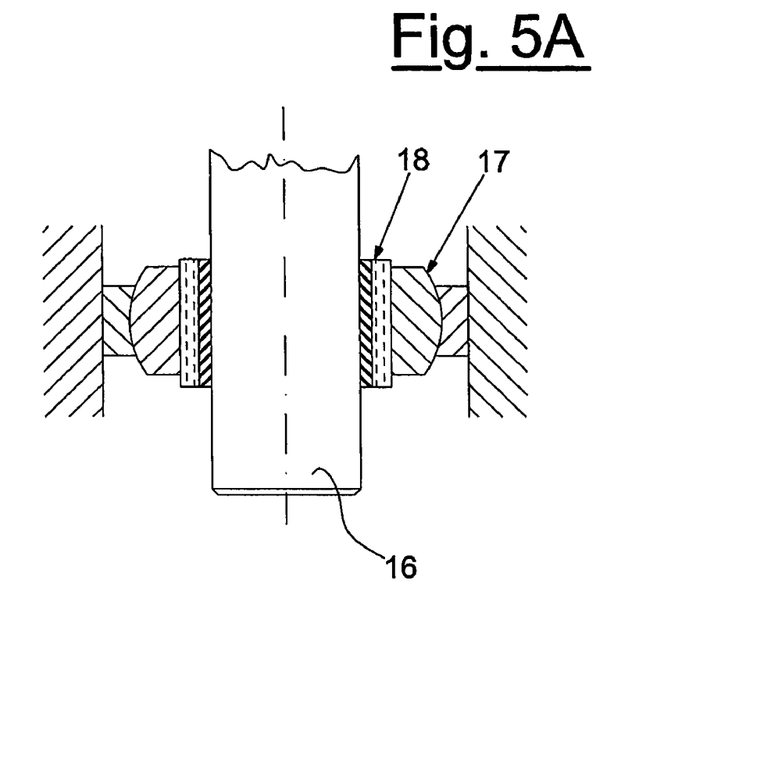
FIGS. 5A and 5B schematically show two embodiments of a spherical and sliding joint realised through a cylindrical and a spherical bearing, the cylindrical bearing being respectively either internal with respect to the spherical bearing or external.
Figure 5B:
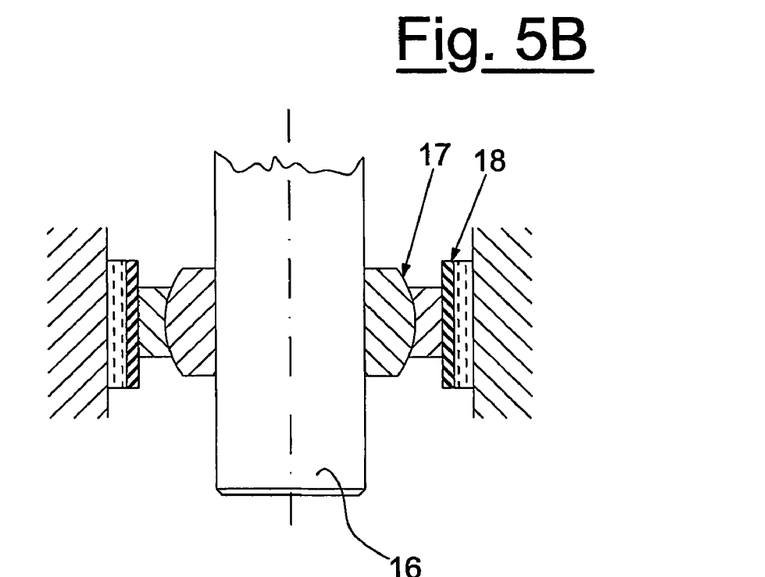

FIGS. 5A and 5B schematically show two embodiments of rigid spherical joint 17 and slider 18 type binding. In FIG. 5A the cylindrical plane bearing 18 is between the end 16 of the arm 15 and the spherical joint 17. In FIG. 5B the spherical joint 17 is between the end 16 of the arm 15 and the cylindrical plane bearing 18.

Figure 5C:
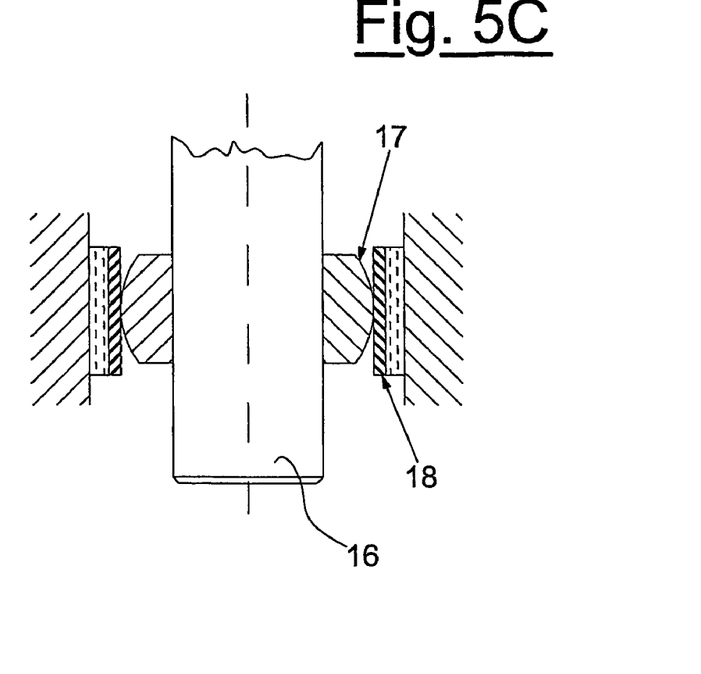
FIGS. 5C and 5D schematically show another two embodiments of a spherical and sliding joint realised through a rigid sliding/spherical bearing.
Figure 5D:
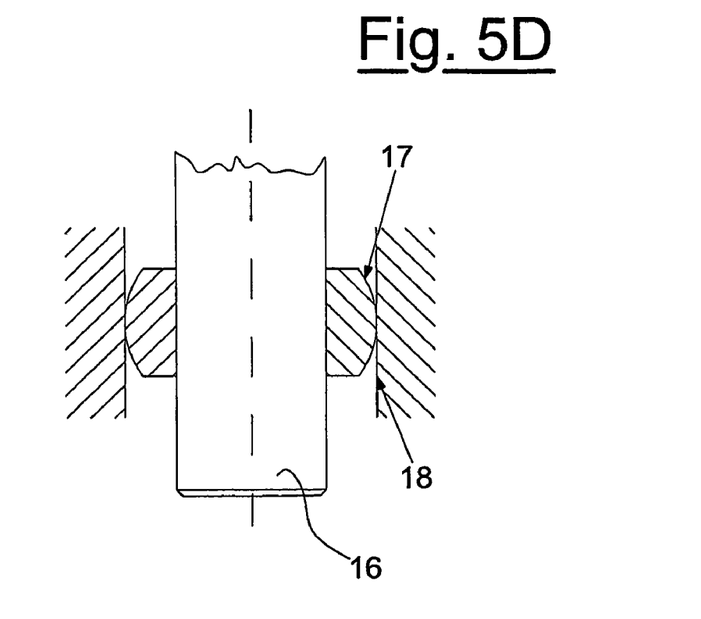

FIGS. 5C and 5D schematically show other two embodiments of rigid spherical joint 17 and slider 18 type binding. In FIG. 5C the convex surface of the spherical joint 17 acts directly on the cylindrical surface of the plane bearing 18. In FIG. 5D the convex surface of the spherical joint 17 acts directly on the cylindrical surface of the housing that has the function of the plane bearing 18. FIGS. 5C e 5D schematically show a sphere, or a convex element, sliding into a cylinder.

To measure the generalised forces acting along axes passing through a point of a generic body, therefore, the measuring structure 12 of the device for measuring forces and moments 10 according to the invention that comprises the three arms 15 is suitably bound with such a body. The bindings arranged at the ends of the arms are of the spherical joint 17 and slider 18 type, rigid or elastic, and they allow a statically determined or statically non determined structure to be obtained. From the six measurements of the perpendicular bending moments that act along the length of each arm 15, for example obtained through strain gauges 14, a force vector F, splitted into three vectors directed along three coordinated axes, and a moment vector M, splitted into three vectors directed along three coordinated axes, can be measured.

Figure 6:
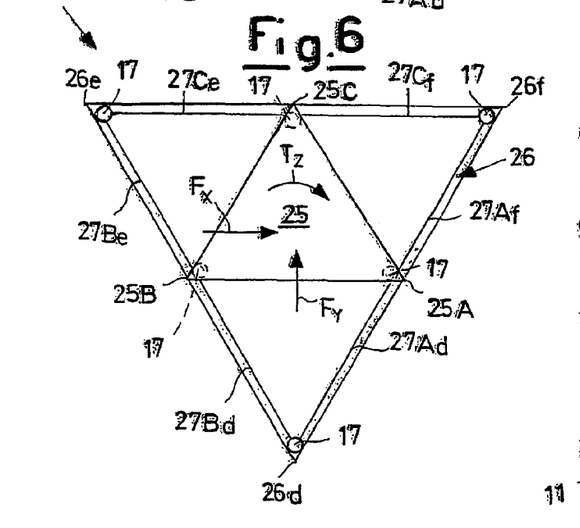
FIGS. 6 to 8 schematically show a second embodiment of a device for measuring forces and moments according to the present invention, subject to generalised forces T and F.
Figure 7:
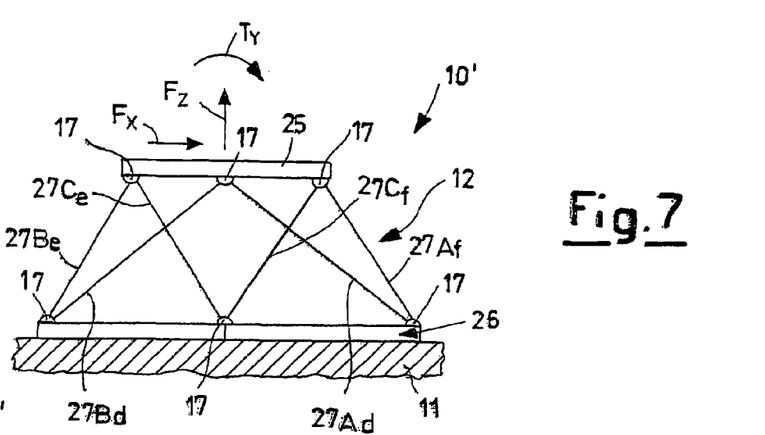
Figure 8:
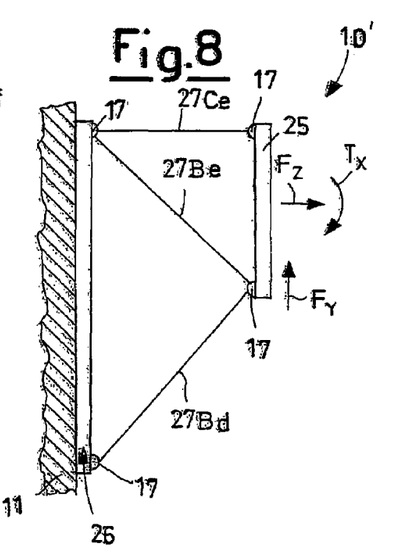

FIGS. 6 to 8 show a second embodiment with six bindings of the device for measuring forces and moments 10' according to the present invention, in which the measuring structure 12 is made up of two triangular rigid elements, an upper plate 25 and a lower plate 26, bound together at the respective three vertices 25A, 25B, 25C, 26$d$, 26$e$ and 26$f$ through two connecting rods 27 for each vertex. The two connecting rods link two contiguous vertices of the opposite triangle. As shown in the drawings from 6 to 8 the connecting rods 27Ad and 27Af link the vertex 25A of the upper triangle with the two contiguous vertices 26$d$ and 26$f$ of the lower triangle 26.

With respect to that which has been shown schematically in the figures, the triangular rigid elements 25 and 26 can have a more complex shape, just as the connecting rods 27 can be lengthened or shorted and arranged spatially with different proportions with respect to that which has been illustrated.

The connection elements at the ends of the connecting rods 27 are realised through spherical joints or spherical hinges 17, or rather elastic elements made from elastomer that can be modelled by means of spherical joints with low stiffness in rotation. The structure described here in which the rigid triangular elements 25 and 26 are connected through three statically determined triangles realised through connecting rods 27 is known by the name "hexapod reticular structure".

One of the rigid plates, for example the lower plate 26, is rigidly connected to a body 11, of which one wishes to measure the stress, as shown schematically in the figures, in which the active external forces are schematically indicated, decomposed on three coordinated axes.

Each connecting rod 27, being subject to axial force, apart from approximations that lead to insignificant errors, can be used to measure the traction or compression force acting on it. Knowing the forces that are therefore exclusively axial or about axial acting on each connecting rod, from the balance of the upper triangle 25 or lower triangle 26 it is possible to derive the acting external forces.

Through the relationship introduced previously $F_g = C \cdot S$ the relationship between the measurement vector S and the acting generalised forces is established.

Figure 9:
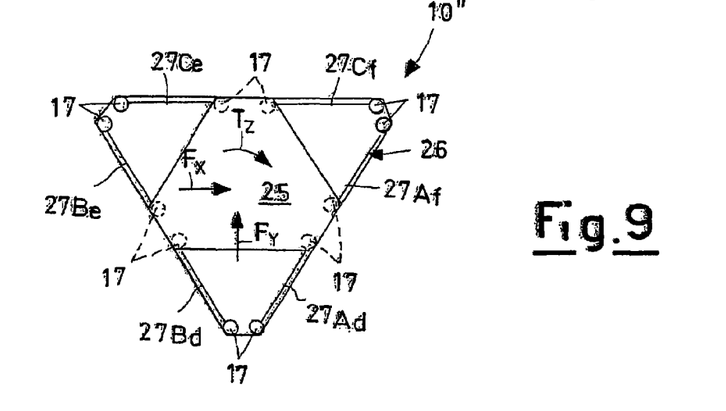
FIG. 9 shows a further schematic embodiment of the device of FIGS. 6-8.

A further embodiment of the device for measuring forces and moments 10'' according to the present invention, similar to the device 10' described previously, is shown in FIG. 9. The connecting rods 27 are connected to the triangular rigid elements 25 and 26 through spherical joints 17 that are distinct and do not coincide like in FIG. 6, providing greater simplicity of design of the joints themselves.

As already described previously for the arms of the measuring structure, the bindings at the end of the connecting rods can also be realised through rigid elements or else through elastic elements.

For example, the constraints 17 can be realised through spherical joints, self-aligning ball bearings or else radial ball bearings designed with suitable clearance.

Alternatively or in combination with the aforementioned rigid connection elements, elastic elements can be used with suitably defined characteristics to avoid the introduction of significant errors in the measurement of the generalised forces T and F.

For example, the elastic Hooke's joint 21 arranged in series with the elastic cylindrical hinge 22, which in FIG. 5 are shown coupled in addition to a thin plate sheet 24, represent a possible embodiment of an elastic spherical joint 17.

Figures 10, 11, 12:
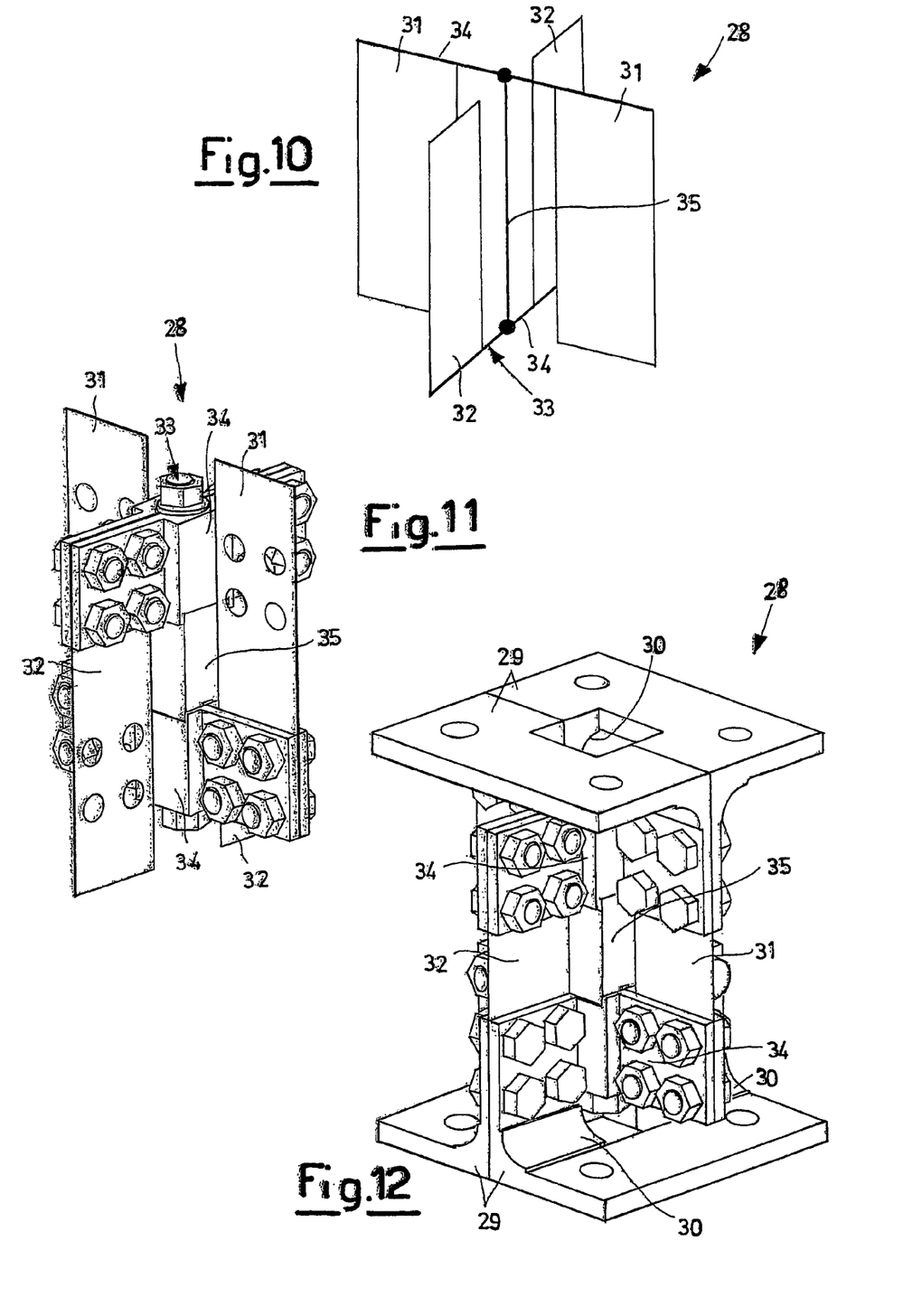
FIG. 10 is a schematic representation of an elastic Hooke's joint with bending elements, which realises an elastic connection element.
FIGS. 11 and 12 show a possible embodiment of the elastic Hooke's joint with bending elements of FIG. 10.

In the case in which the forces acting on the connecting rods 27 are substantially always traction forces, the elastic Hooke's joint shown in FIG. 5 could be replaced with the elastic Hooke's joint with bending elements 28 shown schematically in FIG. 10 and according to a possible non-limiting example embodiment in FIGS. 11 and 12.

The opposite parts to be connected 29 through Hooke's joint with bending elements 28 terminate with a fork element 30, as shown in FIG. 12, and can be connected, for example through bolts, respectively to two pairs of thin plates 31 and 32 that realise the joint according to two perpendicular planes. Indeed, at their opposite ends the thin plates 31 and 32 are bound to a cross element 33 consisting of two perpendicular elements 34 jointed by a spacing cross member 35.

The elastic Hooke's joint with bending elements 28 has the advantage of being a system that, in the case of small deformations, allows the typical behaviour of a Hooke's joint with practically zero friction and clearance to be obtained. The elastic Hooke's joint with bending elements can be used in the device for measuring forces and moments, subject of the present invention as well as in other devices in which it is necessary to have, for rotations of a few degrees, a double hinge with perpendicular axes and practically zero friction and clearance.

Figure 13:
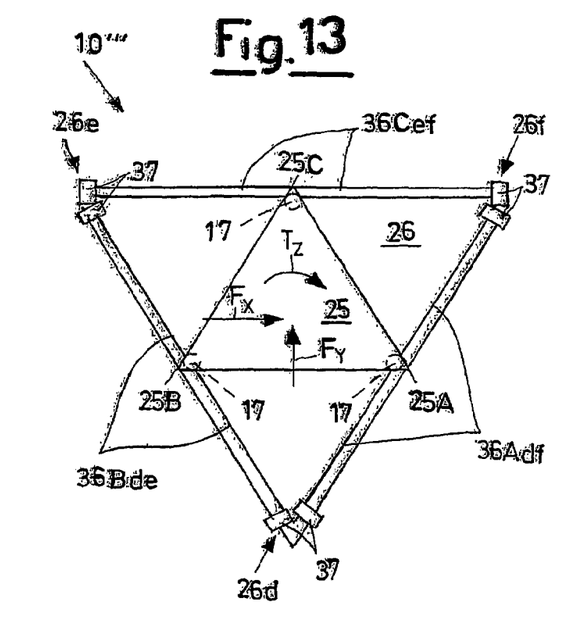
FIGS. 13 to 15 schematically show a further embodiment of a device for measuring forces and moments according to the present invention, subject to generalised forces T and F.
Figure 14:
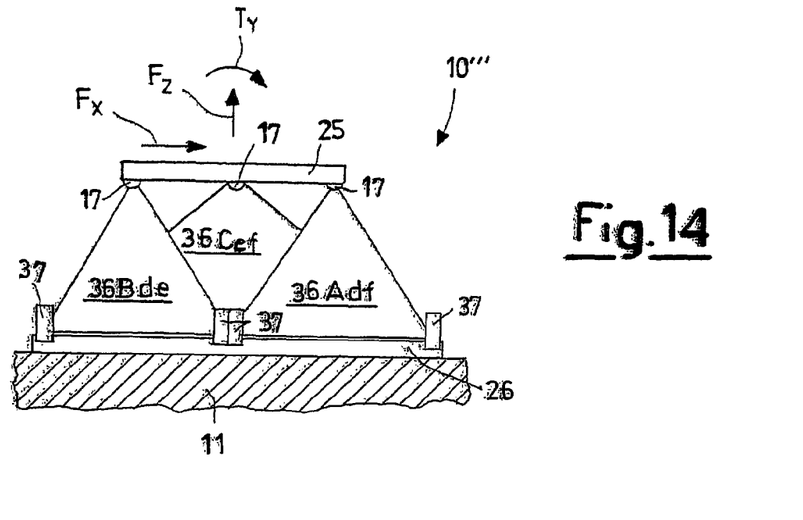
Figure 15:
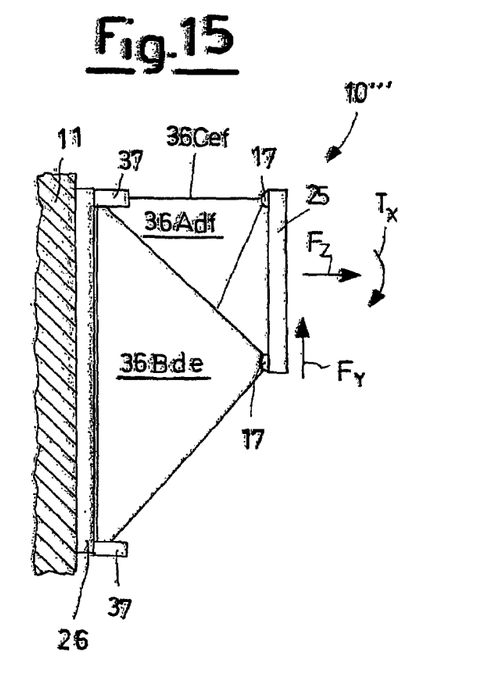

Finally, a further embodiment of the device for measuring forces and moments 10''' with three bindings according to the present invention is shown schematically in FIGS. 13 to 15.

The measuring structure 12, on which the active external generalised forces are shown schematically, is constructed by means of two triangular rigid elements, an upper plate 25 and a lower plate 26, linked together at the respective three vertices 25A, 25B, 25C, 26d, 26e and 26f through three shell elements 36, substantially triangular in shape, which in the figures are shown as flat, just as an example.

The elements 36Adf, 36Bde and 36Cef, shown in the figures, are connected to the lower element 26 through a hinge 37 type binding and to the upper element 25 through a spherical joint 17.

The rigid triangular elements 25 and 26 are thus connected through the three shell elements 36 bound in a statically determined way; each element 36 is subject to bending moment and to axial action and can be used to measure the forces acting on the device.

Indeed, knowing the stresses acting on each element 36, which can for example be measured through strain gauges according to that which has been illustrated, from the equilibrium of the upper triangle 25 or lower triangle 26 the acting external generalised forces can be worked out through the relationship introduced previously $F_g = C \cdot S$.

The bindings 17 and 37 shown schematically in the figures can be realised through rigid elements, as well as through elastic elements.

For example, the constraint 17 can be realised through spherical joints, self-aligning ball bearings or else radial ball bearings manufactured with suitable axial clearance.

The binding 37 can, for example, be realised by suitably combining plain bearings, radial ball bearings or else a sleeve with balls and/or rollers.

Alternatively or in combination with the aforementioned rigid connection elements, elastic elements can be used with suitably defined characteristics to avoid the introduction of significant errors in the measurement of the generalised forces T and F.

The device and method for measuring forces and moments object of the present invention has the advantage of being easily adaptable for measuring the forces acting on different types of bodies.

The device and method for measuring forces and moments object of the present invention has the advantage of being constructively simple and robust. Since the measuring device is mounted in a substantially statically determined way (when the assembly is statically non determined the effects coming from statically non determined assembly are controlled and of minimal influence because the stiffness of the connections is always predefined, so being relatively low, the yield of the bindings will have little influence on the measurement, a fact that cannot be ensured with other known systems, mounted in a highly statically non determined manner.

The device for measuring forces and moments thus conceived is susceptible to numerous modifications and variants, all of which are covered by the invention; moreover, all of the details can be replaced with technically equivalent elements. In practice, the materials used, as well as the sizes, can be whatever according to the technical requirements.

The invention claimed is:

1. Method for measuring forces and moments acting on a body, characterised in that it comprises the application onto the said body (11) of a measuring structure (12), comprising one or more elements, connected together through a plurality of elastic connection elements or elastic bindings (17,18,37) in a statically non determined way; said body (11) being stressed by generalised forces described by the vector Fg=[Fx Fy Fz Tx Ty Ta], to be determined, Fg being defined by the components along three coordinated axes of the generalised external forces (a moment vector T and a force vector F orientated in any way), said vector Fg being obtained by measuring on said measuring structure (12) six magnitudes in one or more points, said magnitudes defined by a vector S=[S1 S2 S3 S4 S5 S6]; and deriving the vectors F and T from the mathematical relationship between Fg =[Fx Fy Fz Tx Ty Tz] and S=[S1 S2 S3 S4 S5 S6] for statically non determined structures wherein said mathematical relationship comprises matrices containing terms dependent upon the geometric dimensions of said measuring structure (12) and terms related to stiffness of said elastic connection elements for elastic bindings (17,18, 37) said measuring structure (12) comprising three arms (15) carrying at the end (16) said connection elements consisting of spherical joints (17) free to translate in the direction of the axis of the arms (15) because of a further slider type binding (18); six bending moments are measured, said six moments being two perpendicular bending moments for each arm.

2. Device for measuring forces and moments acting on a body, characterised in that it comprises a measuring structure (12) made up of one or more elements and provided with a plurality of elastic connection elements or elastic bindings (17,18,37) for the connection between the elements of the structure (12) or a body (11) the subject to generalised forces which one wishes to measure, in which said structure (12) is statically non determined, said structure (12) being equipped with means for measuring (14), in one or more points, six stress and/or deformation magnitudes S=[S1 S2 S3 S4 S5 S6] from which the force vector F=[Fx Fy Fz] and moment vector T=[Tx Ty Tz] acting on the body (11) are worked out mathematically wherein said measuring structure comprises three arms (15) carrying at the end (16) connection elements consisting of spherical joints (17) free to translate in the direction of the axis of the arms (15) because of a further straight slider type binding (18) said spherical joints (17) with slider (18) consist of an elastic support that is very rigid in its radial direction and very flexible in the other direction comprising an element made from elastomer (19) inserted into one or two containment elements (20), inside which the end (16) of said arm (15) is positioned.

3. Device according to claim 2, characterised in that said spherical joints(17) with slider (18) consist of an elastic Hooke's joint (21) equipped with bushes with zero clearance and friction (23), arranged in series with an elastic cylindrical hinge (22) consisting of a further bush with zero clearance and friction (23), suitable for realising a spherical joint with practically zero clearance and friction, placed in series with a thin plate with four fixed ends (24) yielding elastically in the axial direction, suitable for realising a slider (18) type binding.

4. Device according to claim 2, characterised in that said arms (15) are each equipped with two pairs of strain gauges (14a,14b), said measuring means (14) being suitable for measuring two perpendicular bending moments acting at each arm (15).

5. Device for measuring forces and moments acting on a body, characterised in that it comprises a measuring structure (12) made up of one or more elements and provided with a plurality of elastic connection elements or elastic bindings (17,18,37) for the connection between the elements of the structure (12) or a body (11) the subject to generalised forces which one wishes to measure, in which said structure (12) is statically non determined, said structure (12) being equipped with means for measuring (14), in one or more points, six stress and/or deformation magnitudes S=[S1 S2 S3 S4 S5 S6] from which the force vector F=[Fx Fy Fz] and moment vector T=[Tx Ty Tz] acting on the body (11) are worked out mathematically said structure comprises two triangular rigid elements, an upper plate (25) and a lower plate (26), bound together at the respective three vertices (25A, 25B, 25C, 26d, 26e and 26f) through two connecting rods (27) for each vertex, said connecting rods (27) being suitable for linking two contiguous vertices of the opposite triangle (25,26) through connection elements realised through spherical joints (17) wherein said spherical joints (17) consist of an elastic Hooke's joint (21) equipped with bushings with zero clearance and friction (23), arranged in scrics with an elastic cylindrical hinge (22) consisting of a further bushing with zero clearance and friction (23).

6. Device according to claim 5, characterised in that said spherical joints (17) are elastic and realised through elements made from elastomer designed with low stiffness in rotation.

7. Device according to claim 5, characterised in that said spherical joints (17) consist of an elastic Hooke's joint with bending elements (28) comprising a cross (33) consisting of two perpendicular arms (34) joined by a spacing cross member (35), in which two pairs of thin plates (31,32), suitable for realising a double hinge with perpendicular axes and practically zero friction and clearance, are linked to the arms (34).

8. Device according to claim 7, characterised in that said pairs of thin plates (31,32) are each connected at the opposite end with respect to the cross (33) to a fork element (30) suitable for being made integral with the parts to be interconnected.

9. Device according to claim 5, characterised in that said connecting rods (27) are equipped with means for measuring (14) the axial traction or compression force to which they are subjected.

* * * * *